US012770185B1

(12) United States Patent
Lohia et al.

(10) Patent No.: US 12,770,185 B1
(45) Date of Patent: Oct. 20, 2026

(54) SYSTEMS AND METHODS FOR PRIVACY-PRESERVING MULTI-AGENT FINANCIAL CRIME DETECTION WITH CROSS-JURISDICTIONAL COMPLIANCE MANAGEMENT

(71) Applicants: Anannya Lohia, New York City, NY (US); Alak Das, Bellemead, NJ (US); Reetesh Ghosh, Plainsboro, NJ (US); Amit Gupta, Palmetto, FL (US)

(72) Inventors: Anannya Lohia, New York City, NY (US); Alak Das, Bellemead, NJ (US); Reetesh Ghosh, Plainsboro, NJ (US); Amit Gupta, Palmetto, FL (US)

( * ) Notice: Subject to any disclaimer, the term of this patent is extended or adjusted under 35 U.S.C. 154(b) by 0 days.

(21) Appl. No.: 19/296,493

(22) Filed: Aug. 11, 2025

(51) Int. Cl.
*G06Q 40/02* (2023.01)
*G06Q 30/018* (2023.01)

(52) U.S. Cl.
CPC ....... *G06Q 40/024* (2025.08); *G06Q 30/0185* (2013.01)

(58) Field of Classification Search
CPC ......................... G06Q 40/024; G06Q 30/0185
See application file for complete search history.

(56) References Cited

U.S. PATENT DOCUMENTS

| | | | | |
|---|---|---|---|---|
| 9,064,364 | B2 | 6/2015 | Abe et al. | |
| 10,460,320 | B1 * | 10/2019 | Cao | G06N 20/10 |
| 11,227,067 | B2 | 1/2022 | Bercich et al. | |
| 12,045,716 | B2 * | 7/2024 | Bercich | G06Q 30/0185 |
| 12,373,897 | B1 * | 7/2025 | Tran | G06F 40/295 |
| 12,489,633 | B1 * | 12/2025 | Arkoff | H04L 9/3213 |
| 2025/0078083 | A1 * | 3/2025 | Arora | G06N 20/00 |
| 2025/0258708 | A1 * | 8/2025 | Crabtree | G06F 9/5027 |
| 2025/0299183 | A1 * | 9/2025 | Vaidya | G06Q 20/4016 |
| 2025/0348787 | A1 * | 11/2025 | Tharaken | G06N 20/00 |

FOREIGN PATENT DOCUMENTS

| | | | |
|---|---|---|---|
| CN | 111818186 | A | 10/2020 |
| WO | 2024189231 | A1 | 9/2024 |

* cited by examiner

*Primary Examiner* — Garcia Ade
(74) *Attorney, Agent, or Firm* — The Rapacke Law Group, P.A.; Andrew S. Rapacke; Kenneth F. Brooks

(57) ABSTRACT

A computer-implemented system for detecting financial crimes while preserving data privacy includes a multi-agent orchestration framework that coordinates autonomous agents configured for ingestion, pattern recognition, investigation, and reporting of financial transaction data. The system applies tokenization, jurisdiction-aware workflow management, and differential privacy safeguards, with a privacy-aware permission model and execution within confidential computing enclaves. These agents collaborate under access constraints to detect suspicious behavior and generate regulatory reports without exposing sensitive information.

7 Claims, 9 Drawing Sheets

SYSTEMS AND METHODS FOR PRIVACY-PRESERVING MULTI-AGENT FINANCIAL CRIME DETECTION WITH CROSS-JURISDICTIONAL COMPLIANCE MANAGEMENT

TECHNICAL FIELD

The embodiments generally relate to the technical field of systems and methods for privacy-preserving financial crime detection and compliance management.

BACKGROUND

Financial institutions commonly use rule-based monitoring systems and transaction filters to identify potentially illicit activities. These conventional systems typically apply predefined thresholds and deterministic logic to flag anomalies in transaction amounts, frequency, or destinations. Alerts generated by these systems are then reviewed manually by compliance officers who determine whether further investigation is warranted. While these tools support regulatory obligations and assist in identifying certain types of suspicious behavior, they often operate in isolated environments and are not designed to adapt dynamically to emerging criminal methodologies.

To enhance the analytical capabilities of traditional systems, some institutions have integrated machine learning models that classify transactions based on learned patterns. These models are trained on historical data and can recognize more subtle indications of risk compared to static rule sets. In many cases, these systems are hosted on centralized platforms that aggregate sensitive financial and personal data. However, such centralized architectures may pose challenges related to data security, privacy, and compliance with cross-border regulatory restrictions. Moreover, many of these tools lack mechanisms to ensure granular access controls or to enforce compliance across different jurisdictions.

Some recent approaches attempt to incorporate privacy measures, such as encryption or basic anonymization, into data analysis workflows. These measures are often applied during data ingestion or storage but do not extend comprehensively throughout the investigative process. Additionally, conventional systems are not typically designed to allow multiple financial institutions to collaborate on investigations without compromising customer confidentiality. This lack of interoperability and privacy-preserving design can limit the effectiveness of financial crime detection, particularly when suspicious activities span across institutional or national boundaries.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

A system and method for privacy-preserving financial crime detection enables collaborative analysis across institutions while maintaining strict data privacy and regulatory compliance. The system incorporates a multi-agent orchestration framework that coordinates the activities of autonomous agents, each assigned specialized roles in data ingestion, pattern recognition, investigation, and reporting. These agents operate within a privacy-aware permission structure and execute their functions in trusted execution environments that isolate sensitive processes within secure hardware enclaves.

The system processes financial transaction data using a data ingestion agent that applies tokenization and anonymization techniques, allowing subsequent agents to conduct analysis without direct exposure to sensitive attributes. A pattern recognition agent identifies potentially suspicious activity in tokenized data using machine learning models designed for graph-based behavioral analysis. This agent operates without access to raw personal identifiers, preserving compliance with privacy regulations.

Investigative workflows are managed by a dedicated agent that adapts analytical procedures based on regulatory requirements, user roles, and the current phase of investigation. Reporting agents then generate summaries and compliance documentation with masking techniques tailored to the recipient's authorization level. The orchestration framework ensures that each agent accesses only the minimum necessary data, supporting jurisdiction-specific limitations and reducing exposure risks.

The system supports federated learning and secure multiparty computation, enabling collaborative model training and analytical insight sharing across multiple institutions without requiring the exchange of raw or centralized data. By distributing learning and model updates through encrypted mechanisms, the platform facilitates shared intelligence while preserving the independence and privacy of each institution's data.

Visualization tools in the platform present network relationships among financial entities using privacy-enhancing techniques such as k-anonymity filtering, access-level-based data masking, and visual differential privacy. An audit trail subsystem records all data interactions and agent activities to support cross-jurisdictional compliance and regulatory transparency. These integrated components overcome the data exposure, interoperability, and compliance challenges found in conventional systems by enabling secure, adaptive, and collaborative financial crime investigations.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
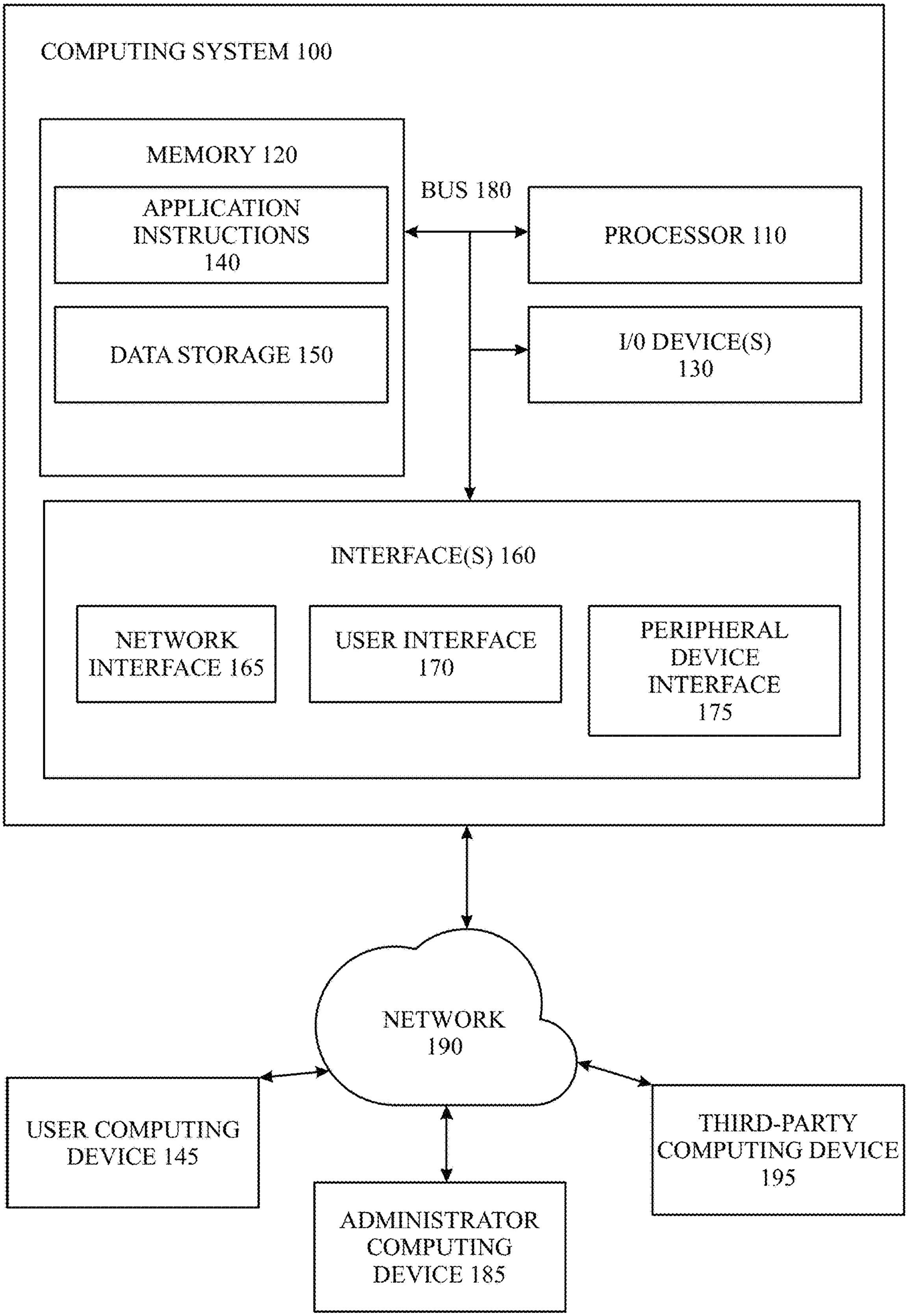
FIG. 1 illustrates a system architecture diagram, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

A computer-implemented system for financial crime detection may be deployed across one or more processors configured to execute components within a layered architecture. The system may include a multi-agent orchestration framework, a set of privacy-preserving agents, privacy infrastructure, a graph-based analytics engine, and cross-jurisdictional compliance tooling. Each of these components may be designed to cooperate through defined interfaces and scoped data access policies. The system may be hosted in cloud-based environments, within on-premises infrastructure, or in hybrid deployments.

A multi-agent orchestration framework may serve as the control layer that coordinates autonomous agents across different stages of financial crime detection. These agents may be instantiated as microservices or containerized applications that operate under constraints defined by a permission management subsystem. Each agent may be configured to perform a distinct function in the investigative workflow, including ingestion, analysis, investigation, and reporting, and may receive only the data necessary for its specific task.

A data ingestion agent may be configured to receive raw financial transaction data from external systems such as banking ledgers, transaction logs, or streaming financial feeds. Upon ingestion, the agent may parse records, identify sensitive attributes such as account numbers, names, addresses, and other personally identifiable information (PII), and apply tokenization to each such field. Tokenization may be implemented using a deterministic mapping scheme that allows relationship integrity to be preserved across tokenized records. Token-to-original-value mappings may be securely stored in a hardware security module (HSM) and may not be accessible to any analysis agent. In some implementations, the data ingestion agent may also perform format-preserving encryption or anonymization in combination with tokenization for layered protection.

A pattern recognition agent may be responsible for identifying transaction-level or network-level anomalies. This agent may access tokenized data only and may employ graph-based machine learning models trained to detect common patterns associated with financial crime typologies. These models may include graph convolutional networks, unsupervised clustering methods, or path-based anomaly detection algorithms. The pattern recognition agent may generate probability scores or alerts for transactions or entities suspected of involvement in laundering, fraud, or coordinated behavior. In one variation, the agent may flag circular fund flows, rapid fund transfers across accounts, or transaction cycles consistent with layering behaviors in money laundering.

An investigation agent may orchestrate analysis procedures based on investigative context. It may receive parameters such as jurisdictional origin of the transaction, type of financial entity, and the current stage of review. Based on these parameters, the investigation agent may select a subset of applicable models, define access windows for specific data fields, and assign agents to tasks accordingly. The investigation agent may also track contextual metadata and ensure that regulatory constraints, such as data residency and access limitations, are enforced during each operation. This agent may act as a coordinator rather than a processor, dynamically routing requests between agents and modules while adhering to predefined access policies.

A reporting agent may prepare compliance documentation or investigative outputs for human review. This agent may retrieve metadata, model outputs, and summary statistics generated by other agents and format them for presentation or export. Before disclosure, the reporting agent may apply data masking techniques based on the recipient's access tier. For instance, summary data may be fully disclosed to internal compliance officers while external regulatory recipients may receive redacted or aggregated data with differential privacy applied. This agent may also generate and digitally sign records of actions taken, for storage in an immutable audit trail repository.

The system may include a privacy-aware permission management system that enforces least-privilege access principles. Permissions may be evaluated dynamically based on agent identity, user role, investigation stage, and applicable regulatory constraints. Access decisions may be computed at runtime and cached for efficiency. The privacy-aware permission management system may support both role-based access control (RBAC) and attribute-based access control (ABAC) models. In some embodiments, permission evaluations may use an embedded policy language that maps agent tasks to data classes and contextual variables.

To ensure computational privacy, a confidential computing environment may be employed. Each agent may run within a secure enclave provided by a trusted execution environment (TEE), such as Intel SGX or ARM TrustZone. These enclaves may cryptographically isolate code and data during execution, preventing even privileged system processes from accessing protected content. Agents may be deployed in secure containers or virtual machines that are attested prior to execution to verify their integrity. In some instances, agents may share encrypted memory spaces or use secure inter-process communication channels for coordination.

The system may implement federated learning to train shared machine learning models across institutional boundaries. Each participating institution may maintain a local model that trains on its private data. Rather than transmitting raw training data, only encrypted model updates or gradient deltas may be sent to an aggregation service using secure multi-party computation protocols. This enables institutions to contribute to a global model while maintaining local data privacy. Homomorphic encryption may be applied in some variations to allow computations to be performed directly on encrypted weights or gradients.

For visualization, the system may generate interactive graphs showing entity relationships and suspicious activity patterns. The graphical user interface may support dynamic data masking, where displayed node or edge attributes change based on the authorization level of the user. Relationship abstraction may be used to suppress transaction-level data in favor of aggregated entity interactions, unless detailed access is granted. K-anonymity thresholds may prevent the display of patterns involving fewer than k entities, and visual differential privacy techniques may introduce calibrated noise into layout or metrics to reduce identifiability risk.

An audit trail repository may store signed logs of all system activities, including data access events, model executions, permission decisions, and reporting actions. Each log entry may include a timestamp, agent identifier, hashed record ID, action performed, and a digital signature. Logs may be stored in a tamper-evident ledger to support regulatory investigations and system monitoring.

The system may enforce cross-jurisdictional compliance by deploying components across cloud regions aligned with legal residency requirements. Data tagged for specific geographic retention may be routed to region-specific storage or compute nodes. Purpose limitation controls may be enforced through the orchestration layer, with technical constraints that prevent use of data for unauthorized functions. Where required, explainable AI outputs may be generated by the system to provide natural language or graphical summaries of decision-making rationale, enabling compliance officers and auditors to understand the reasoning behind automated flags.

Each component described may be deployed independently or integrated into a comprehensive platform for financial crime detection. The modular nature of the system allows institutions to selectively adopt components while maintaining privacy and compliance standards appropriate to their operational needs.

Various implementations of the invention involve the technical field of systems and methods for privacy-preserving financial crime detection and compliance management including receiving financial transaction data from multiple data sources; preprocessing the received data using a data ingestion agent that applies tokenization and anonymization; analyzing the preprocessed data using a network analysis engine that maps inter-entity relationships and identifies patterns indicative of financial crimes; executing privacy-preserving computations across institutional boundaries using federated learning and secure multi-party computation to generate updated detection models; presenting analysis results through a privacy-enhanced graphical user interface that applies data masking, k-anonymity filtering, and visual differential privacy based on user access levels; and logging all data access, model interactions, and system outputs to an audit trail repository for regulatory review and cross-jurisdictional compliance and are therefore necessarily rooted in computer technology. For example, the aforementioned steps are inherently computer-based and cannot be performed in the human mind.

The present invention amounts to more than merely implementing the generic computer as a tool to gather, analyze, and output data because the steps of the present method, system, or product improve systems and methods for privacy-preserving financial crime detection and compliance management by providing: a modular agent architecture that separates functions across specialized agents with scoped access, reducing data exposure risk; multi-layered privacy that combines tokenization, differential privacy, confidential computing, and federated learning to protect sensitive data end-to-end; cross-institutional intelligence that enables privacy-preserving collaboration across financial institutions without centralizing data; and graph-based analysis with visual privacy that graphs analytics and privacy-enhanced visualizations to detect complex patterns while preserving confidentiality.

Additionally, the steps of the present invention would be impossible to accomplish on pen and paper due to the volume of data being communicated and received over a network in real-time. In particular, the speed at which the steps of the present invention occur to effectuate the disclosed method, system, or product would involve large-scale, continuous wireless communication of such data. That is, the steps of the present method, system, or product are impossible to accomplish on pen and paper, cannot be accomplished as a method of organizing human activity, and amount to significantly more than merely gathering, analyzing, and outputting data.

Implementations of the present invention include implementing (executing, running, or deploying) one or more artificial intelligence models on a computing device wherein the computing device executes the artificial intelligence model's algorithms and mathematical functions on computer hardware using machine learning libraries. The computing device implements the artificial intelligence model when it performs tasks like training, making predictions, applying the model to data, decision-making, classification, or generating outputs based on inputs. In particular, the speed at which an artificial intelligence model analyzes and transforms data to effectuate the disclosed method, system, or product would involve large-scale, continuous transformation of such data. As such, the present invention would be impossible to accomplish on pen and paper or in the human mind due to the volume of data being analyzed and transformed by the artificial intelligence model.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computer system 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized by a user to interact with the various functionalities of the system. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
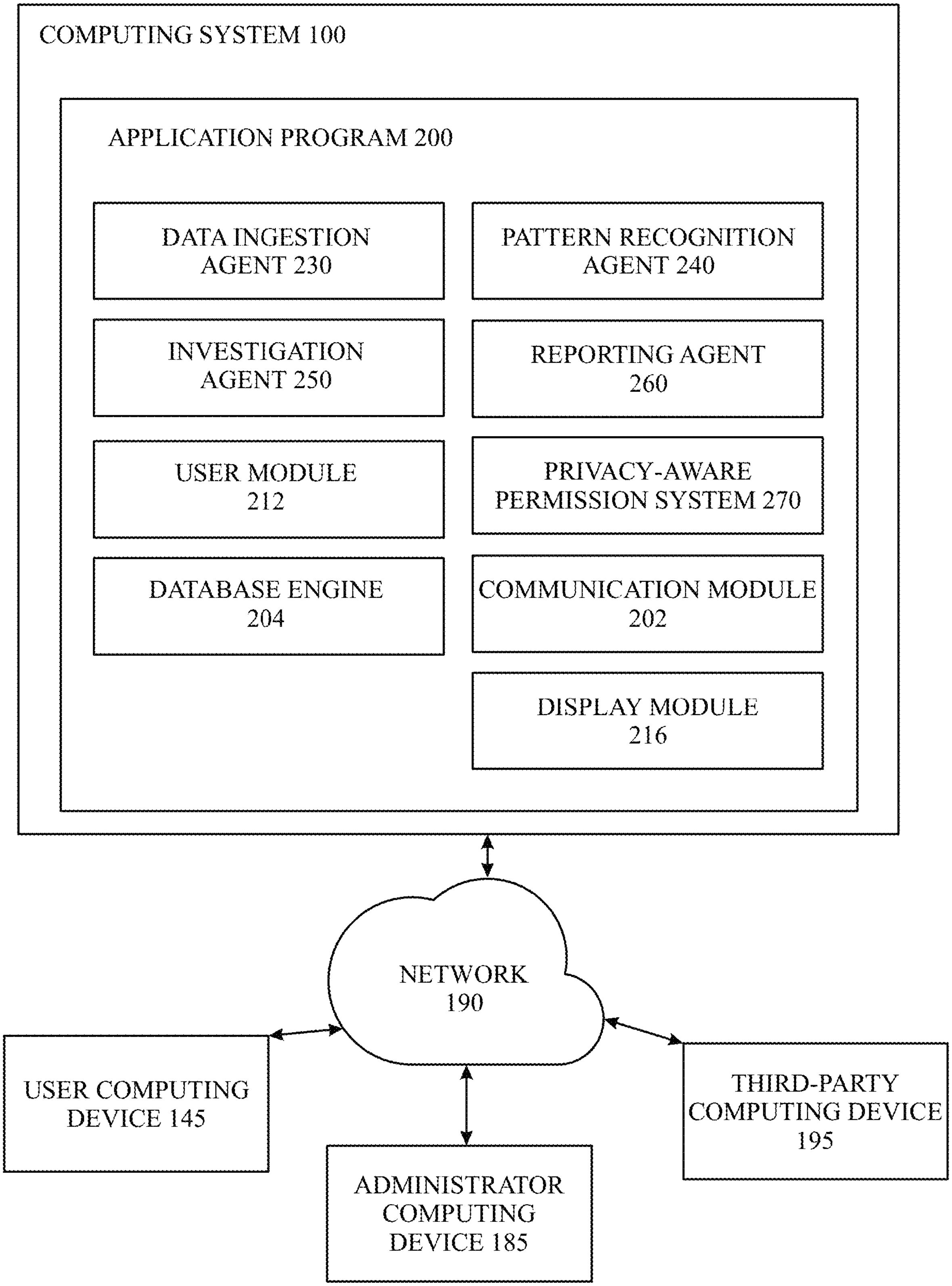
FIG. 2 illustrates an application program and modules in communication with the computing system, according to some embodiments.

FIG. 2 illustrates an example computer architecture for the application program 200 operated via the computing system 100. The computer system 100 comprises several modules and engines configured to execute the functionalities of the application program 200, and a database engine 204 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of a data ingestions agent 230, a pattern recognition agent 240, an investigation agent 250, a reporting agent 260, a privacy-aware permission system 270, a communication module 202, a database engine 204, a user module 212, and a display module 216.

In some embodiments, the data ingestion agent 230 is configured to receive, parse, and preprocess raw financial transaction data from one or more external data sources, such as bank transaction logs, payment systems, internal ledgers, or external APIs. The data ingestion agent 230 may normalize the incoming data into a standardized schema suitable for downstream processing by other agents in the system. In some embodiments, the data ingestion agent 230 is configured to apply tokenization techniques to sensitive data fields, including but not limited to account numbers, customer identifiers, IP addresses, or location metadata. Tokenization may be performed using a deterministic mapping scheme that preserves referential integrity across data records, thereby allowing the detection of networked relationships while obfuscating the original values. In some implementations, the mapping between tokens and original values may be stored in a secure hardware security module (HSM), and the data ingestion agent 230 may be restricted from accessing this mapping after the initial tokenization process. In some embodiments, the data ingestion agent 230 may classify each field in the incoming data according to a sensitivity level and apply an appropriate privacy-preserving transformation. For example, less sensitive fields may be generalized or masked, while highly sensitive fields may be encrypted using format-preserving encryption or subjected to irreversible hashing. The tokenization and classification logic may be implemented using rule-based engines or machine learning classifiers trained on annotated datasets. In some embodiments, the data ingestion agent 230 is further configured to append regulatory metadata to each data record, such as jurisdiction of origin, data residency requirements, and permissible usage contexts. This metadata may be used by other agents, such as the investigation agent or the reporting agent, to enforce compliance with cross-jurisdictional privacy rules and access limitations. In some embodiments, the data ingestion agent 230 may operate within a trusted execution environment (TEE) to isolate its operations from the rest of the system. This may ensure that sensitive inputs are handled within a confidential computing enclave before tokenized data is made available to other agents. The agent may also log metadata about ingestion activities, such as timestamps, source identifiers, and applied transformations, which may later be included in an immutable audit log maintained by the compliance system. In some implementations, the data ingestion agent 230 may include connectors or adapters to support integration with multiple financial systems using protocols such as ISO 20022, SWIFT, or proprietary data feeds. The agent may also validate schema conformance, detect malformed inputs, and quarantine anomalous or noncompliant records for manual review before they are processed further.

In some embodiments, the pattern recognition agent 240 is configured to identify potentially suspicious activity within financial transaction data by analyzing tokenized representations of entities and their relationships. The agent may operate exclusively on data that has been anonymized or tokenized by the data ingestion agent, ensuring that its operations remain compliant with privacy constraints and that no raw personally identifiable information (PII) is directly accessed during analysis. In some embodiments, the pattern recognition agent 240 is configured to transform transactional data into graph-based representations, where nodes represent entities such as accounts or individuals and edges represent financial interactions such as transfers, deposits, or withdrawals. The agent may employ graph database technologies or graph processing frameworks to store and traverse these relationship structures. It may extract features from graph topology such as degree centrality, betweenness, path length, and clustering coefficients, which may then be used to characterize network behavior. In some embodiments, the pattern recognition agent 240 applies machine learning algorithms, including supervised or unsupervised models, to detect patterns indicative of fraud, money laundering, or coordinated behavior. These models may include graph neural networks (GNNs), autoencoders, clustering algorithms, or probabilistic models trained on historical transaction data. The agent may be trained to detect typologies such as smurfing, circular fund flows, rapid transits between multiple accounts, or transactions that mimic legitimate behavior while masking illicit intent. In some embodiments, the pattern recognition agent 240 is further configured to operate under differential privacy constraints. Statistical outputs or model scores generated by the agent may have calibrated noise applied to them to reduce the risk of re-identification while maintaining sufficient utility for downstream decision-making. The privacy budget associated with each analysis may be dynamically adjusted based on the user's authorization level or the investigation stage. In some embodiments, the pattern recognition agent 240 may receive real-time or batch-mode data from the ingestion agent and may continuously update pattern detection results as new transactions are added. Model inference may be performed within a trusted execution environment to ensure confidentiality of the tokenized input data and the resulting analytical outputs. The agent may also interact with federated learning infrastructure to periodically receive model updates trained across institutional boundaries, allowing it to refine its detection capabilities without direct access to external raw data. In some implementations, the pattern recognition agent 240 may prioritize alerts or generate risk scores for flagged entities, which may then be passed to the investigation agent for further contextual analysis. These outputs may include metadata about the pattern identified, affected entities, and the confidence level of the detection, all formatted in a structure suitable for privacy-compliant audit logging and subsequent regulatory reporting.

In some embodiments, the investigation agent 250 is configured to coordinate privacy-preserving analytical workflows that support the detection, review, and escalation of potentially suspicious financial activity. The investigation agent 250 may act as a task orchestrator, managing the execution of analysis routines by other agents while enforcing contextual data access controls based on regulatory requirements, user roles, and the current stage of the investigation. In some embodiments, the investigation agent 250 is configured to receive inputs from the pattern recognition agent, including risk scores, flagged entities, and descriptions of anomalous behavior. Based on these inputs, the investigation agent 250 may initiate additional workflows to validate, enrich, or correlate the detected patterns with related data records. It may access a subset of tokenized or anonymized records, limited to only what is required for a specific investigative action, and may ensure that access permissions are evaluated before each operation is executed. In some embodiments, the investigation agent 250 dynamically adjusts its workflows according to jurisdiction-specific regulatory metadata embedded in the transaction records. For example, the agent may apply different privacy rules, audit requirements, or access controls depending on whether the transaction originates from or affects accounts in jurisdictions with differing compliance mandates. This may be achieved through integration with a policy engine or by referencing a regulatory ruleset that maps country or region codes to enforceable technical constraints. In some embodiments, the investigation agent 250 may delegate subtasks to other agents or system components, including generating enhanced graph views of transaction paths, querying for additional historical behavior, or invoking federated model queries to supplement local intelligence. These operations may be scheduled in sequence or parallel, with outputs routed back to the investigation agent for consolidation and review. In some embodiments, the investigation agent 250 maintains a stateful context of each case or review session, allowing investigators to audit the decision history, data accessed, and transformations applied during the course of analysis. This state may be logged to a compliance audit trail and may include signed entries that identify which agents or users initiated specific actions. In some implementations, the investigation agent 250 may also support configurable investigation templates that define workflows for specific scenarios, such as fraud monitoring, anti-money laundering (AML) case review, or politically exposed person (PEP) screening. These templates may encode recommended investigation sequences, permissible data scopes, and reporting formats, allowing the agent to act as a procedural controller that ensures consistency, compliance, and privacy throughout the investigative process.

In some embodiments, the reporting agent 260 is configured to generate investigation summaries and regulatory compliance reports that reflect the outcomes of privacy-preserving financial crime analysis workflows. The reporting agent 260 may collect, format, and disclose relevant data derived from the outputs of other agents, including investigation findings, entity risk scores, and analytical insights, while enforcing appropriate data masking and privacy controls based on the recipient's authorization level and regulatory context. In some embodiments, the reporting agent 260 is configured to apply dynamic data masking techniques to conceal or generalize sensitive data fields within generated reports. This may include redacting personally identifiable information (PII), aggregating transactional data, or substituting detailed fields with high-level descriptors, depending on the recipient's access tier or the jurisdictional rules governing the information. These masking operations may be guided by an access control policy engine that maps user roles or entity types to permissible data views. In some embodiments, the reporting agent 260 is further configured to integrate differential privacy techniques into its reporting pipeline. When producing statistical summaries or trend analyses, the agent may apply calibrated noise to the outputs in order to prevent re-identification of individuals or transaction patterns while still preserving the analytical utility of the report. This feature enables the system to support both internal review functions and external audits without compromising underlying privacy guarantees. In some embodiments, the reporting agent 260 generates structured output in formats suitable for regulatory filings, including reports aligned with anti-money laundering (AML) standards, suspicious activity reports (SARs), or jurisdiction-specific compliance requirements. The agent may support export to formats such as XML, JSON, or PDF, and may include metadata required for electronic submission through regulated channels. In some embodiments, the reporting agent 260 maintains an immutable audit log of each report generation event, including timestamp, report type, agent ID, user authorization level, and applied transformations. These logs may be cryptographically signed and stored in a tamper-evident ledger to provide verifiable traceability of all reporting actions. This ensures that regulators or internal compliance teams may retrospectively validate that disclosures were made in accordance with legal and technical policies. In some implementations, the reporting agent 260 may be configured to trigger alerts or follow-up actions based on report contents. For example, if the generated output exceeds a risk threshold or identifies activity patterns associated with high-risk entities, the agent may automatically notify investigators, compliance officers, or designated escalation contacts. This feature enables the system to support proactive, event-driven compliance management while maintaining strict adherence to privacy and disclosure controls.

In some embodiments, the privacy-aware permission system 270 is configured to control and enforce access to financial data, system functions, and analytical outputs based on predefined privacy constraints, user roles, investigation stage, and regulatory jurisdiction. The permission system 270 may operate as a policy enforcement layer that governs how agents and users interact with data resources throughout the investigation and reporting process. In some embodiments, the privacy-aware permission system 270 is configured to evaluate access requests dynamically by applying a combination of role-based access control (RBAC) and attribute-based access control (ABAC) models. These models may incorporate attributes such as agent type (e.g., ingestion, analysis, reporting), the sensitivity classification of data fields, the current state of an investigation, and geographic or jurisdictional metadata. This enables the system to tailor access decisions in real-time to ensure that only the minimum necessary data is exposed to authorized parties. In some embodiments, the privacy-aware permission system 270 maintains a hierarchical structure of permissions that differentiates between system-level privileges, institutional roles (e.g., compliance officers, investigators, external regulators), and context-specific policies that vary based on the regulatory environment. The system may store these policies in a machine-readable format, allowing them to be versioned, audited, and updated without requiring system downtime. In some embodiments, the privacy-aware permission system 270 is further configured to enforce least-privilege principles at the agent level. When an agent is instantiated by the orchestration framework, the permission system 270 may generate a scoped access profile that defines which data fields, transaction segments, or system functions the agent may interact with. This profile may be cryptographically signed and validated at runtime, ensuring that agents operate within their authorized boundaries even in distributed or asynchronous execution environments, n some embodiments, the permission system 270 may integrate with a jurisdictional rules engine to apply regional privacy regulations such as data localization requirements, disclosure restrictions, or data subject access rights. For example, if a financial transaction originates from a jurisdiction that prohibits the transfer of certain personal data across borders, the permission system may deny cross-region access to those attributes while still allowing authorized local analysis to proceed. In some implementations, the privacy-aware permission system 270 may also produce logs of each access decision, including the requesting entity, scope of access, policy applied, and justification for approval or denial. These logs may be recorded in a secure audit trail to support future regulatory reviews and to demonstrate compliance with internal governance frameworks. The system may periodically re-evaluate permissions during long-running investigations, adapting access levels as the scope of analysis changes or as new regulatory information becomes available.

In some embodiments, the communication module 202 is configured for receiving, processing, and transmitting a user command and/or one or more data streams. In such embodiments, the communication module 202 performs communication functions between various devices, including the user computing device 145 of FIG. 1, the administrator computing device 185 of FIG. 1, and a third-party computing device 195 of FIG. 1. In some embodiments, the communication module 202 is configured to allow one or more users of the system, including a third-party, to communicate with one another. In some embodiments, the communications module 202 is configured to maintain one or more communication sessions with one or more servers, the administrative computing device 185 of FIG. 1, and/or one or more third-party computing device(s) 195 of FIG. 1. In some embodiments, the communication module 202 may allow users and administrators to communicate with one another.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

The user module 212 may store user preferences including the user account information, historical usage data, user personal information, and the like. The user module 212 may facilitate the creation of user's profiles for users, administrators, and others.

In some embodiments, the display module 216 is configured to display one or more graphic user interfaces, including, e.g., one or more user interfaces. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in a display module 216 may not be persistently stored. The display module 216 displays information, notifications, and alerts to the user device which can be viewed and acknowledged by the user.

Figure 3:
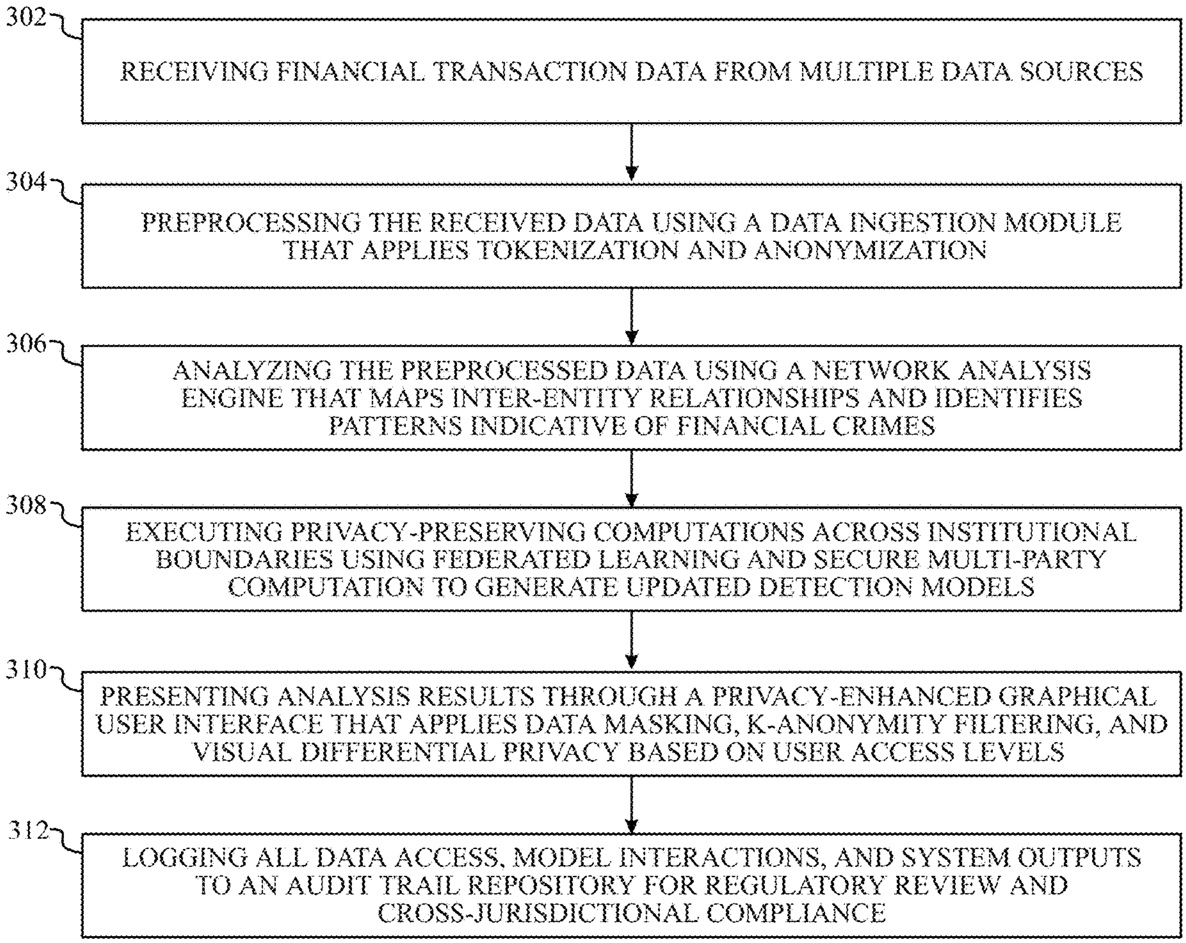
FIG. 3 illustrates a method for performing privacy-preserving financial crime detection across institutional boundaries, according to some embodiments.

FIG. 3 illustrates a method for performing privacy-preserving financial crime detection across institutional boundaries, according to some embodiments. The process begins at step 302, where financial transaction data is received from multiple data sources. These data sources may include internal banking systems, third-party payment networks, regulatory databases, or external financial institutions. The incoming data may contain sensitive attributes such as account identifiers, transaction amounts, timestamps, and location metadata.

At step 304, the received data is preprocessed using a data ingestion module that applies tokenization and anonymization techniques. In some embodiments, tokenization may replace personally identifiable information with deterministic tokens while preserving the referential structure necessary for relationship analysis. Anonymization may include techniques such as generalization or redaction based on data sensitivity classification.

At step 306, the preprocessed data is analyzed using a network analysis engine configured to map inter-entity relationships and detect patterns indicative of financial crimes. The engine may transform transaction data into graph-based representations and apply graph algorithms or machine learning models to identify anomalies such as circular fund flows, transaction bursts, or unusual entity linkages.

At step 308, the system executes privacy-preserving computations across institutional boundaries by employing federated learning and secure multi-party computation. These techniques enable multiple institutions to contribute to shared detection models without disclosing their raw data. Model updates may be aggregated in an encrypted format to refine the analytical models while maintaining local data sovereignty and privacy compliance.

At step 310, the analysis results are presented through a privacy-enhanced graphical user interface. This interface may apply data masking, k-anonymity filtering, and visual differential privacy to ensure that the information displayed conforms to access permissions and privacy regulations. Users may be restricted to view redacted or aggregated data based on their role, authorization level, and the sensitivity of the underlying data.

At step 312, all data access events, model interactions, and system outputs are logged to an audit trail repository. This repository may serve as a secure and immutable ledger that supports regulatory review and cross-jurisdictional compliance. The logged information may include time-stamps, user identifiers, accessed resources, and the privacy policies applied during each action, allowing institutions to maintain traceability and accountability for all investigative activities.

Figure 4:
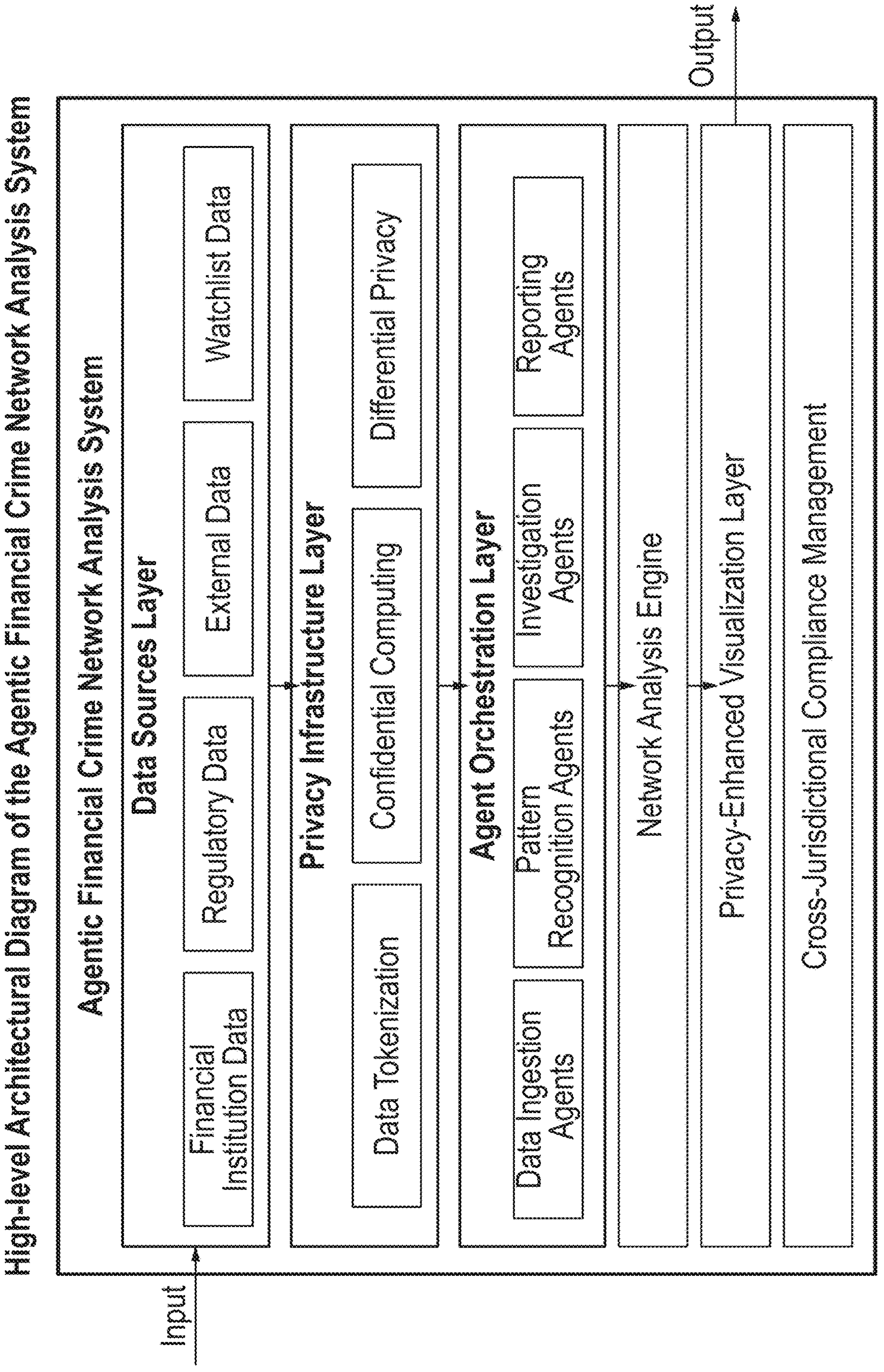
FIG. 4 illustrates a high-level architectural diagram of the agentic financial crime network analysis system, according to some embodiments.

FIG. 4 illustrates a high-level architectural diagram of the agentic financial crime network analysis system. The architecture is organized into a series of functional layers, each contributing to the overall operation of the system in a modular and privacy-preserving manner. From input to output, the system processes data through five primary layers: the Data Sources Layer, the Privacy Infrastructure Layer, the Agent Orchestration Layer, the Network Analysis and Visualization Layer, and the Cross-Jurisdictional Compliance Management Module. The Data Sources Layer includes multiple data inputs originating from diverse sources such as financial institution data, regulatory data, external data feeds, and watchlist data. These inputs may include structured or semi-structured transaction records, jurisdictional compliance directives, and third-party intelligence used to contextualize financial activity. The Privacy Infrastructure Layer applies core privacy-preserving techniques to protect sensitive data throughout the lifecycle of analysis. This layer includes a Data Tokenization module that replaces sensitive attributes with reference-preserving tokens while maintaining relational integrity. A Confidential Computing component ensures that agent operations execute within trusted execution environments, preventing unauthorized access to raw data. The Differential Privacy module introduces statistical noise into query results or visualizations to reduce re-identification risk while preserving analytical value. The Agent Orchestration Layer manages the execution and coordination of specialized autonomous agents. These include Data Ingestion Agents, which receive and preprocess input data; Pattern Recognition Agents, which identify anomalies and suspicious patterns using machine learning techniques; Investigation Agents, which manage context-aware analysis workflows; and Reporting Agents, which generate compliance documentation tailored to authorization levels and jurisdictional rules. The Network Analysis and Visualization Layer comprises two key components. The Network Analysis Engine maps inter-entity relationships within tokenized datasets and applies graph-based algorithms to identify behavioral patterns indicative of financial crimes. The Privacy-Enhanced Visualization Layer renders the outputs of the analysis engine through interfaces that apply k-anonymity, data masking, and visual differential privacy, adjusting data granularity based on user access level. Finally, the Cross-Jurisdictional Compliance Management Module ensures that the entire system remains compliant with geographic data residency requirements, purpose limitation constraints, and regulatory reporting standards. This module may enforce region-specific rules and maintain an immutable audit trail that records all data interactions, model executions, and agent activities for regulatory oversight. Together, the layers shown in FIG. 4 support an integrated and modular system architecture that enables privacy-preserving, scalable, and regulation-aware financial crime detection.

Figure 5:
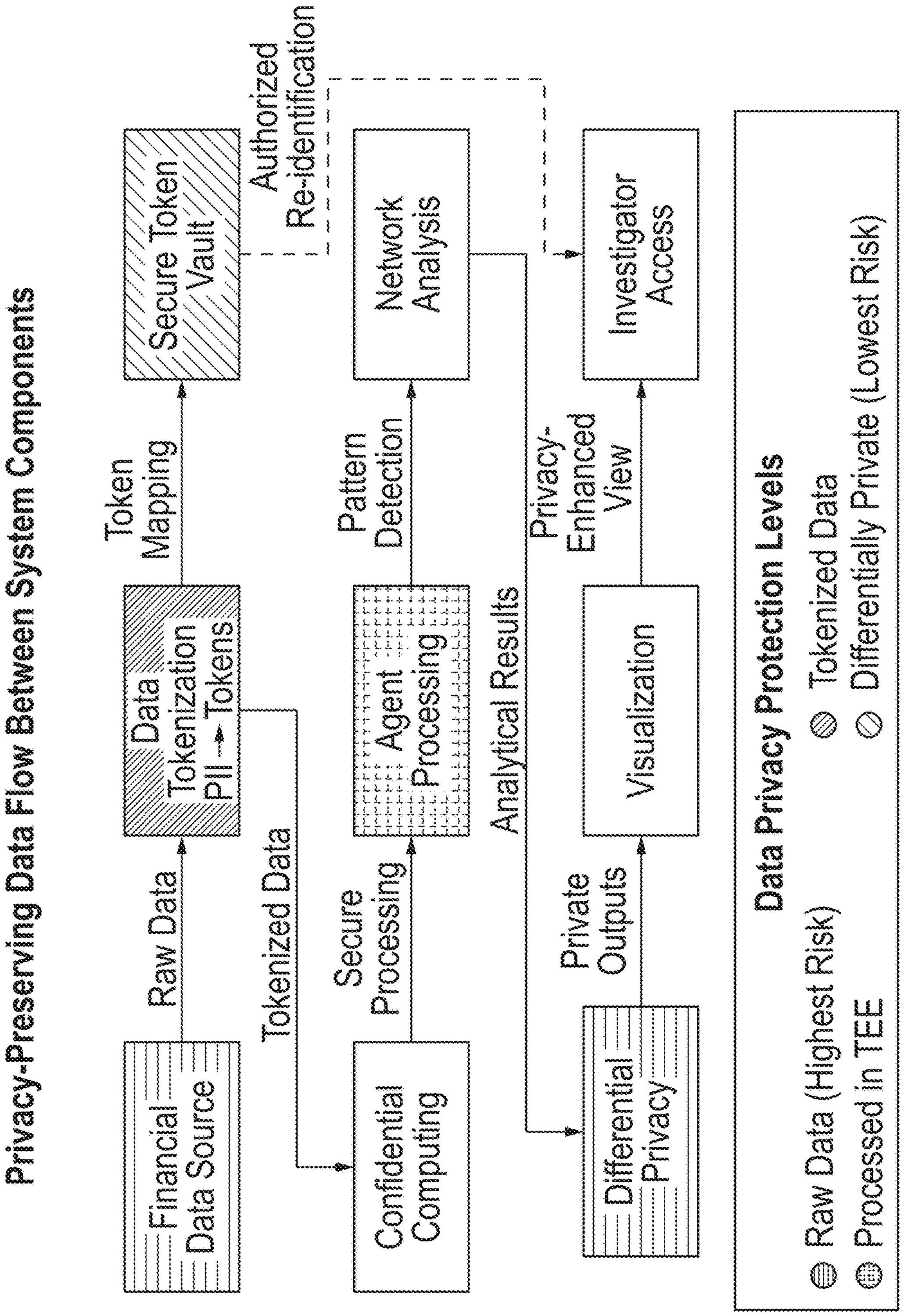
FIG. 5 illustrates a modular representation of a privacy-preserving, agent-based architecture for financial crime network analysis across jurisdictions, according to some embodiments.

FIG. 5 illustrates a modular representation of a privacy-preserving, agent-based architecture for financial crime network analysis across jurisdictions. The diagram presents an overview of the data flow and system interactions among core computational modules, user-facing elements, and compliance layers, with emphasis on data privacy, analytical orchestration, and role-based access control. At the lower tier of the architecture, Distributed Financial Institutions (DFIs) serve as the originating sources of transaction data. These institutions interact with a Privacy Layer, which includes data anonymization, tokenization, and secure computation mechanisms. Each institution retains raw data within its own trust boundary while transmitting only privacy-preserving outputs to the upper layers. The Privacy Layer communicates with the Agentic Analysis System, which is centrally represented as a composite of autonomous agents, each configured to perform a specialized function. The Data Ingestion Agent ingests and tokenizes transaction records. These tokenized records are processed by a Pattern Recognition Agent employing graph-based anomaly detection techniques, which may include detection of circular transactions and multi-hop fund transfers indicative of illicit activities. An Investigation Agent dynamically triggers analysis workflows aligned with the jurisdictional metadata of each transaction. Output from these workflows is passed to the Reporting Agent, which formats results into privacy-tiered compliance reports. Surrounding the agentic modules is the Privacy-Aware Permission Layer, which mediates access control through hierarchical policies combining role-based and attribute-based authorization. The policy engine enforces scope limitations tied to user identity, investigation context, and legal jurisdiction. The top-right section depicts an Audit and Oversight Repository, which receives cryptographically signed logs of agent activity. These logs include access events, data transformation actions, and workflow invocations, and are appended to a tamper-evident ledger that supports compliance review and regulatory audits. Finally, the uppermost User Access and Visualization Layer provides multiple interfaces tailored to different stakeholders, including analysts, regulators, and institution-specific compliance officers. Each interface applies access-specific masking and visualization protocols such as k-anonymity filtering and differentially private metrics, ensuring that visibility aligns with user permissions and regulatory boundaries.

Figure 6:
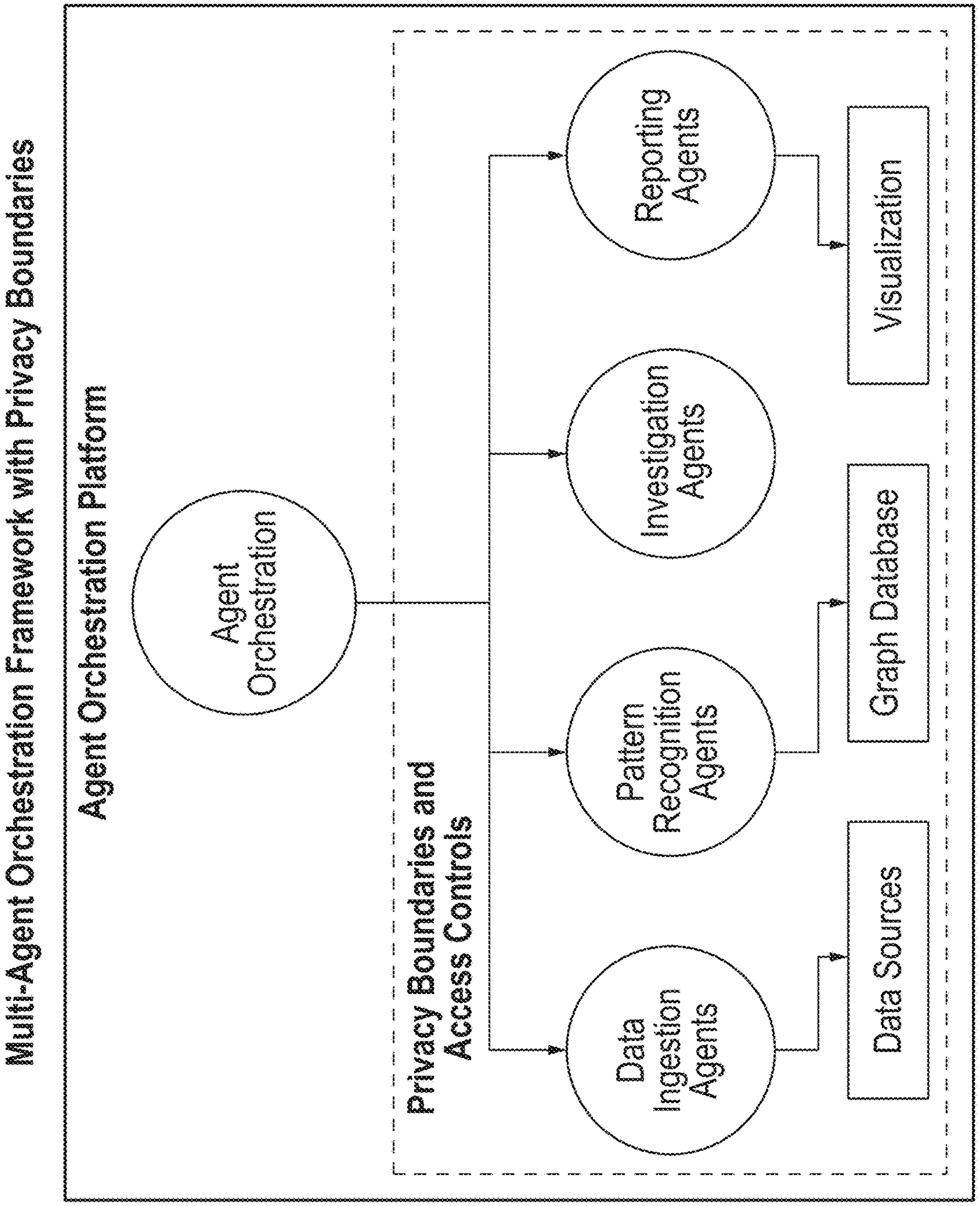
FIG. 6 illustrates a multi-agent orchestration framework with privacy boundaries, forming part of the agent orchestration platform for the disclosed system for privacy-preserving financial crime detection, according to some embodiments.

FIG. 6 illustrates a multi-agent orchestration framework with privacy boundaries, forming part of the agent orchestration platform for the disclosed system for privacy-preserving financial crime detection. This framework enables the controlled coordination and execution of discrete, autonomous agents, each operating under clearly defined access scopes and privacy constraints. At the center of the framework is an Agent Orchestration Module, which governs the deployment and coordination of multiple specialized agents. This module is responsible for managing the lifecycle, task allocation, and inter-agent communication while ensuring that data flows remain consistent with predefined access policies and jurisdictional limitations. The framework includes four primary agent types, each represented as an isolated operational node subject to privacy boundaries and permission controls: Data Ingestion Agents are configured to acquire, normalize, and tokenize raw financial data obtained from one or more external Data Sources. These agents apply tokenization and anonymization processes before the data is made available to any analytical components. Pattern Recognition Agents operate on tokenized data, accessing a Graph Database to analyze inter-entity relationships. These agents detect behavioral anomalies and transactional patterns suggestive of illicit activity using machine learning and graph-based analytical models. Investigation Agents manage privacy-scoped analytical workflows that are tailored to the jurisdictional and regulatory context of the data. These agents interpret flagged activity and orchestrate further analysis using scoped subsets of data drawn from the graph database. Reporting Agents receive structured outputs from the investigation agents and are responsible for generating privacy-compliant reports and audit documentation. Reports may be visualized via a Visualization Module, which supports data masking, k-anonymity filtering, and differential privacy. The entire orchestration process is contained within defined Privacy Boundaries and Access Controls, which regulate each agent's permissions based on operational role, data classification, and investigation context. These controls ensure that agents may only access the minimum necessary data required for their function, in alignment with both internal governance and external regulatory mandates.

Figure 7:
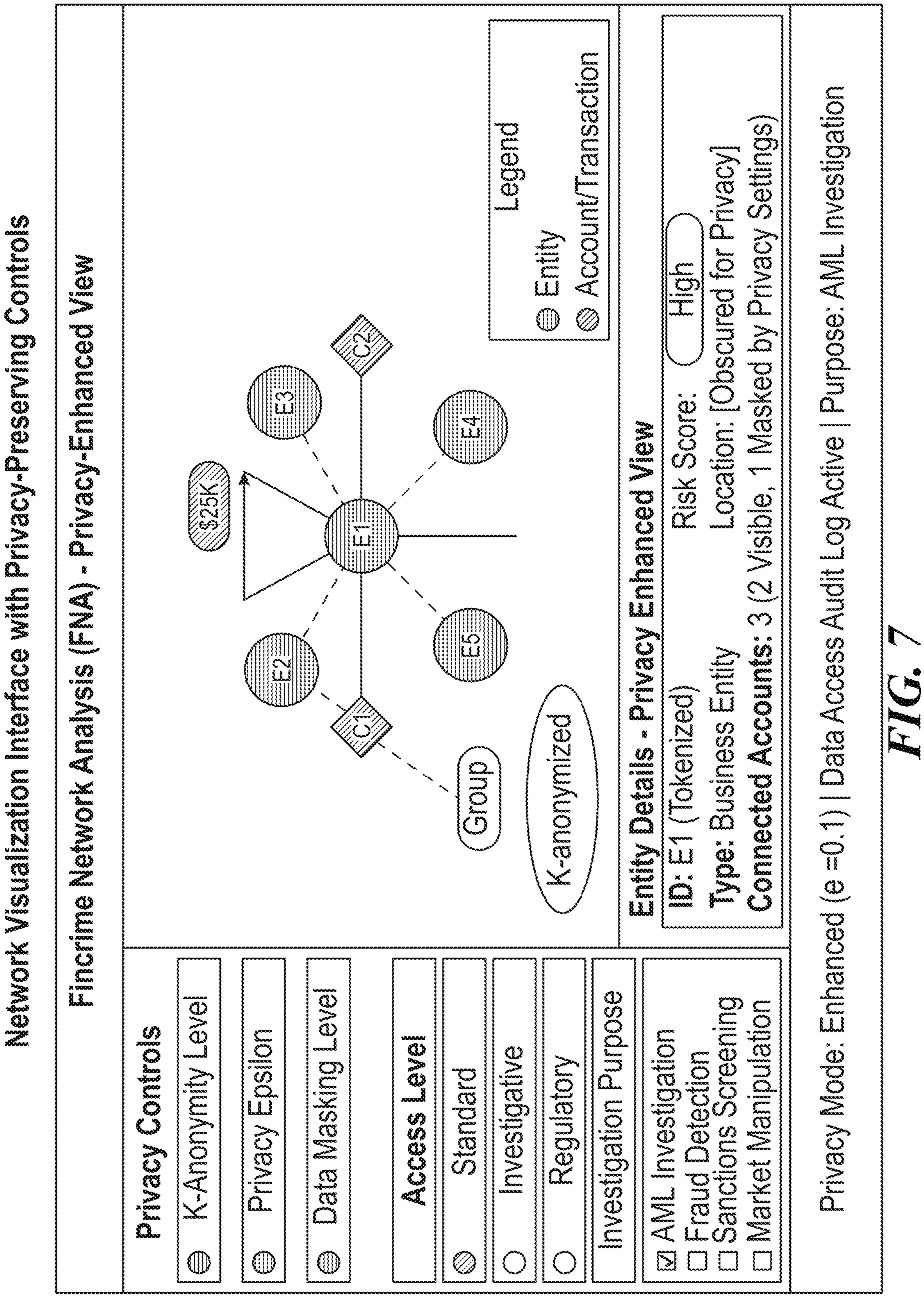
FIG. 7 illustrates a network visualization interface for financial crime analysis (FNA) incorporating privacy-preserving controls, according to some embodiments.

FIG. 7 illustrates a network visualization interface for financial crime analysis (FNA) incorporating privacy-preserving controls. This privacy-enhanced view presents a graphical representation of entities and transactions within a tokenized financial dataset, allowing investigators to examine relationship patterns while preserving the confidentiality of sensitive information in accordance with data access policies and jurisdictional requirements. At the center of the visualization is a dynamic graph comprising nodes and edges. Nodes represent entities, such as individuals, accounts, or organizations, while edges denote transactions or connections between entities. Each node is visually encoded based on privacy attributes, such as k-anonymity level, sensitivity, or masking status, as depicted in the Privacy Controls and Data Masking Level legends in the figure. In some embodiments, nodes may be displayed as either fully masked, partially masked, or unmasked, depending on the viewer's Access Level. These access levels may include Standard, Sensitive, Investigative, or Regulatory, as shown in the figure's access control matrix. The masking applied to each node is dynamically adjusted based on access tier, ensuring that unauthorized users cannot infer sensitive information even through indirect analysis. Each node may also be associated with metadata displayed in the Privacy-Enhanced View panel. This metadata may include: ID (Tokenized entity identifier); Type (e.g., Individual, Account, Group); Risk Score (numerical or categorical rating); Connected Accounts (number of directly linked entities); or Data Visibility Settings (e.g., Viewable, Masked, Obscured by Policy). Groupings or clusters of nodes may represent aggregated entities that are either k-anonymized or abstracted to prevent specific identification where entity uniqueness falls below the defined anonymity threshold. For example, visual representations may collapse into a "Group" node when displaying fewer than k related records. The visualization is generated from processed outputs of the system's graph database and pattern recognition agents, and may be served through a secure web-based or client-native interface. Viewers may apply filtering and focus controls to adjust the scope of displayed data based on role, investigation scope, or privacy level. The Privacy Mode indicator at the bottom of the interface reflects the current configuration of the visualization tool, including: Privacy Mode: (e.g., Enhanced); Data Access Level: (e.g., Audit, Log, Active); Purpose: (e.g., AML Investigation); By incorporating real-time data masking, user-specific visibility constraints, and privacy-aware clustering, FIG. 7 exemplifies how the disclosed system enables compliant, granular, and adaptive visualization of financial relationship networks for investigative and regulatory purposes. In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

Figure 8:
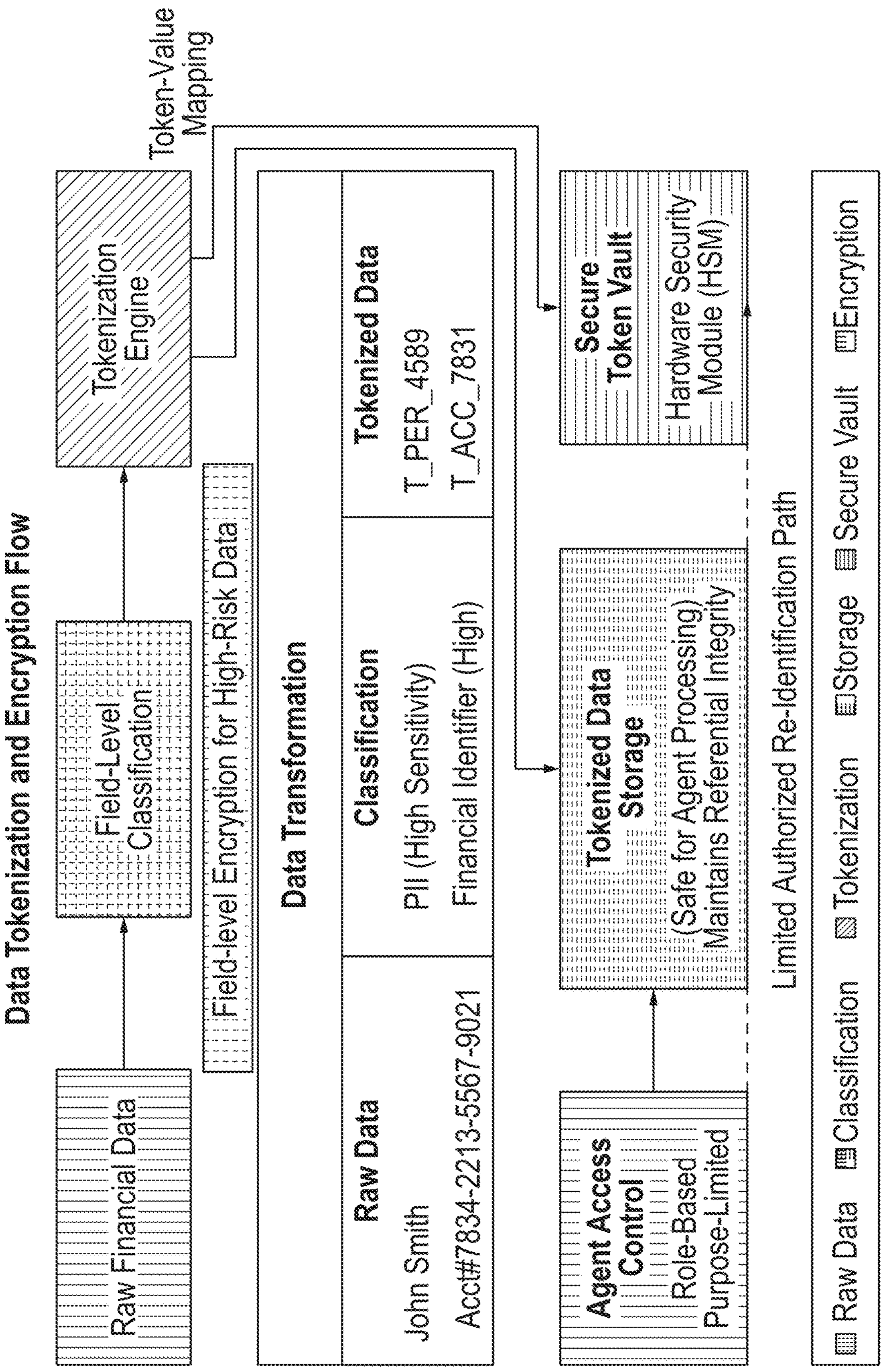
FIG. 8 illustrates the data tokenization and encryption flow within the privacy infrastructure of the disclosed financial crime detection system, according to some embodiments.

FIG. 8 illustrates the data tokenization and encryption flow within the privacy infrastructure of the disclosed financial crime detection system. The process begins with the intake of raw data, which may include personally identifiable information (PII) and high-sensitivity financial identifiers such as names, account numbers, or social security identifiers. These raw data fields undergo a classification phase where attributes are labeled according to sensitivity level and regulatory classification. Once classified, the data is passed through a transformation process in which field-level encryption is applied to high-risk data using cryptographic routines designed for format-preserving confidentiality. Simultaneously, a tokenization engine generates reference-preserving tokens for each sensitive field, replacing original values with pseudonymous strings. For example, "John Smith" and "Acct #921-32-6535-9021" may be converted to "T-PER-4589" and "T-ACC-7831" respectively. The resulting tokenized data is then forwarded along two separate paths. In one path, the tokens are stored within the system's operational workflows where analysis, detection, and reporting are performed exclusively on the transformed data. In the second path, a secure token-value mapping is stored in a secure vault such as a hardware security module (HSM), enabling limited and auditable re-identification in cases of authorized use. The secure vault supports cryptographic isolation from other system components to enforce privacy boundaries. The figure also denotes agent access control, where only pre-authorized agents may retrieve or transform tokenized data, and only under strict conditions such as user authentication, purpose justification, or regulatory approval. Additionally, FIG. 8 identifies multiple layers of protection through iconographic shading to distinguish between raw data, classification and tokenization, secure storage, and encryption zones. By implementing tokenization and encryption at the field level, and separating data access by function and risk profile, the system enforces fine-grained control over data exposure. This structured flow supports compliance with privacy laws, enables secure analytical processing, and provides a cryptographically sound path for re-identification when legally permissible and operationally necessary.

Figure 9:
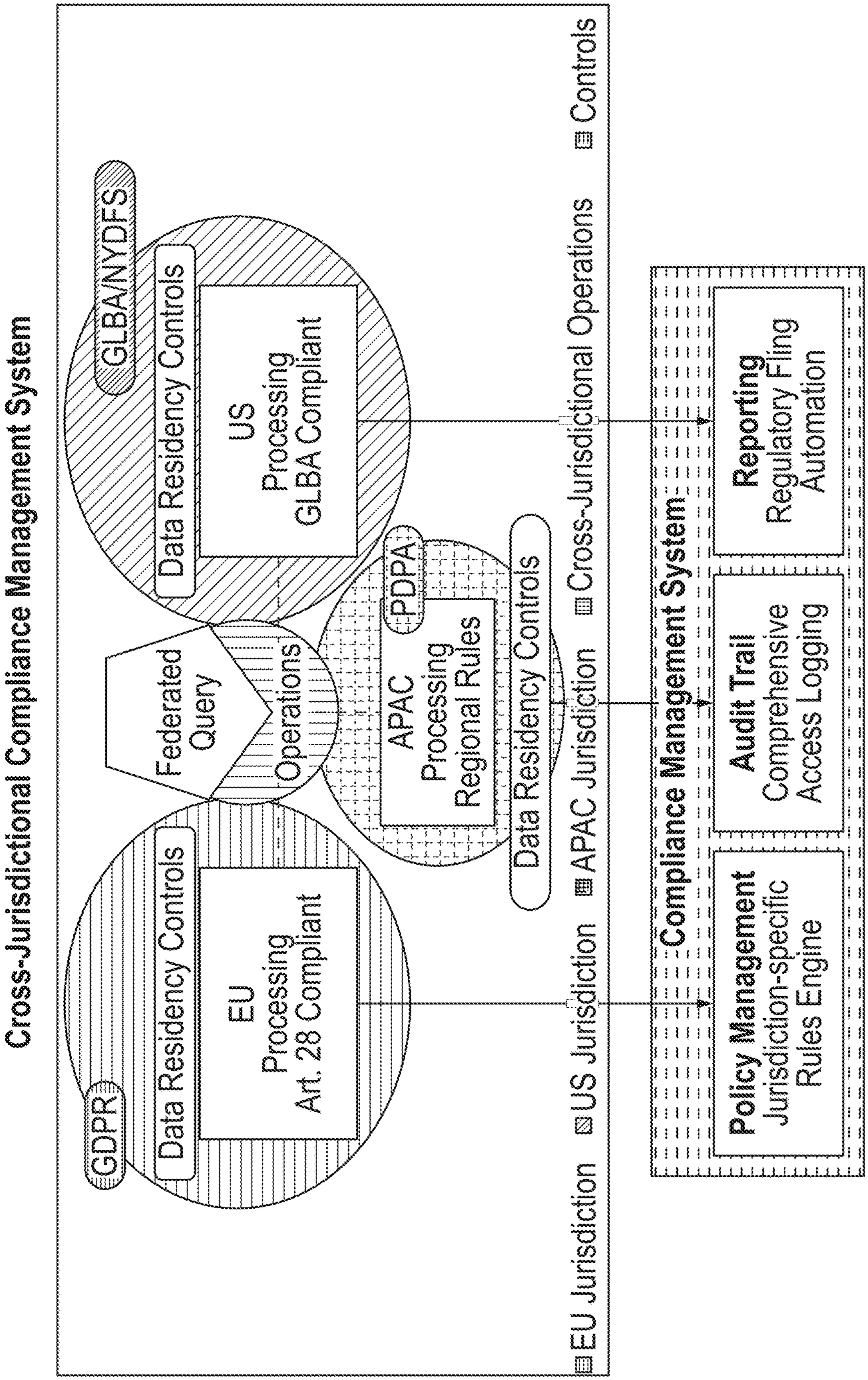
FIG. 9 illustrates the architecture of a cross-jurisdictional compliance management system integrated into the disclosed agentic financial crime detection platform, according to some embodiments.

FIG. 9 illustrates the architecture of a cross-jurisdictional compliance management system integrated into the disclosed agentic financial crime detection platform. This system is designed to ensure that all data processing, storage, and sharing operations comply with region-specific regulatory frameworks, including but not limited to the General Data Protection Regulation (GDPR), the Gramm-Leach-Bliley Act (GLBA), and APAC regional data protection rules. The diagram shows how privacy compliance is enforced across multiple jurisdictions, specifically, the European Union (EU), the United States (U.S.), and the Asia-Pacific (APAC) regions, each of which imposes distinct constraints on data residency, usage, and sharing. At the foundation of the architecture is a Compliance Management System comprising a policy management engine, an audit trail repository, and a reporting module. The policy management component interprets jurisdiction-specific rules and defines enforceable controls within the system, including lawful basis for processing, consent management, and regional data residency enforcement. The audit trail component logs all access events, processing decisions, and system-level operations with high granularity, enabling transparent oversight and historical accountability. The reporting module supports generation of regulatory documentation, internal reviews, and external disclosures required by governing authorities. Surrounding these components are overlapping enforcement zones aligned with jurisdictional data protection frameworks. In the EU region, the system implements controls such as Article 28 contractual safeguards, GDPR-compliant processing logic, and region-specific data residency boundaries. In the U.S. zone, the system incorporates GLBA-compliant procedures and federated query mechanisms that restrict data sharing outside approved legal contexts. The APAC jurisdiction includes its own data residency controls and rule sets governing cross-border data flows. The figure further depicts federated operations across these jurisdictions, where queries may be executed without direct data transfer using privacy-preserving technologies such as secure multi-party computation or federated learning. Controls are enforced at both the infrastructure and orchestration levels to prevent unauthorized access or cross-border leakage. The overlapping compliance zones and controls ensure that multinational financial institutions can conduct investigations, model training, and reporting activities while remaining in compliance with local and international privacy requirements. In total, FIG. 9 demonstrates how the system implements a layered, dynamic approach to regulatory compliance across jurisdictions, enabling adaptive enforcement of privacy, data residency, and reporting obligations through a unified and auditable management framework.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

What is claimed is:

1. A computer-implemented method for performing privacy-preserving financial crime detection across a plurality of financial institutions, the method executed by one or more processors operating within at least one trusted execution environment that cryptographically isolates code and data during execution, the method comprising:

receiving financial transaction data from multiple institutional data sources, wherein the financial transaction data includes sensitive attributes comprising at least one of account identifiers, customer identifiers, and personally identifiable information;

preprocessing the received data using a data ingestion agent executing within the trusted execution environment that applies deterministic, reference-preserving tokenization to the sensitive attributes by replacing each sensitive attribute with a corresponding token according to a token-to-original-value mapping stored in a hardware security module that is inaccessible to a network analysis engine and to a federated learning engine of the method and anonymization;

analyzing the preprocessed data using the network analysis engine operating exclusively on the tokenized data without access to the token-to-original-value mapping, that maps inter-entity relationships and identifies patterns indicative of financial crimes by extracting graph topology features from a graph-based representation of the tokenized data in which nodes represent entities and edges represent financial interactions;

executing privacy-preserving computations across institutional boundaries using a federated learning engine and secure multi-party computation to generate updated detection models, wherein each participating financial institution locally trains a model on its own tokenized data and transmits only encrypted model updates, comprising one or more of encrypted gradients and encrypted weight adjustments, to an aggregation service such that no raw training data is transmitted across institutional boundaries;

presenting analysis results through a privacy-enhanced graphical user interface that applies data masking, k-anonymity filtering, and visual differential privacy based on user access levels, wherein the visual differential privacy comprises injecting calibrated noise into network metrics displayed in the graphical user interface in accordance with a privacy budget that is dynamically adjusted based on an authorization level of a requesting user; and logging all data access, model interactions, and system outputs to a cryptographically signed, tamper-evident audit trail repository for regulatory review and cross-jurisdictional compliance, wherein each log entry includes a timestamp, an agent identifier, a hashed record identifier, an action performed, and a digital signature.

2. The method of claim 1, further comprising identifying previously unknown entity relationships by correlating the deterministic, reference-preserving tokens using a graph database, wherein the correlating preserves relationship integrity across the tokenized data without exposing the sensitive attributes to the graph database.

3. The method of claim 1, wherein the federated learning engine implements the privacy-preserving computations using secure aggregation protocols comprising homomorphic encryption applied to the encrypted model updates that prevent the reconstruction of individual model contributions by the aggregation service.

4. The method of claim 1, wherein the privacy-enhanced graphical user interface provides visualization through force-directed graph layouts with node-level masking and edge obfuscation, wherein the node-level masking is dynamically applied based on the authorization level of the requesting user such that one or more nodes are displayed in one of a fully masked state, a partially masked state, and an unmasked state.

5. The method of claim 1, wherein the visual differential privacy introduces the calibrated noise to the network metrics without materially affecting suspicious pattern detection accuracy, and wherein the privacy budget is reduced as the authorization level of the requesting user decreases.

6. The method of claim 1, wherein the cryptographically signed, tamper-evident audit trail repository includes digitally signed entries that record agent identity, accessed resources, access time, and purpose, and wherein the digitally signed entries are appended to a tamper-evident ledger such that any modification to a previously appended entry is cryptographically detectable.

7. The method of claim 1, wherein the network analysis engine applies relationship abstraction to group individual tokenized transactions, operating within the trusted execution environment, into higher-order entity behaviors, and wherein the relationship abstraction suppresses transaction-level data in favor of aggregated entity interactions unless detailed access is granted by the privacy-aware permission system based on the authorization level of the requesting user.

* * * * *